US012771534B2

(12) United States Patent
Choi et al.

(10) Patent No.: US 12,771,534 B2
(45) Date of Patent: Oct. 20, 2026

(54) METHOD FOR AUTONOMIC MANAGEMENT AND CONTROL IN QUANTUM KEY DISTRIBUTION NETWORK AND APPARATUS FOR THE SAME

(71) Applicant: Electronics and Telecommunications Research Institute, Daejeon (KR)

(72) Inventors: Tae Sang Choi, Daejeon (KR); Tae Yeon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 123 days.

(21) Appl. No.: 18/765,154

(22) Filed: Jul. 5, 2024

(65) Prior Publication Data

US 2025/0119278 A1 Apr. 10, 2025

(30) Foreign Application Priority Data

Oct. 10, 2023 (KR) ........................ 10-2023-0134354
Nov. 29, 2023 (KR) ........................ 10-2023-0169341

(51) Int. Cl.
*H04L 9/08* (2006.01)
*H04L 41/16* (2022.01)

(52) U.S. Cl.
CPC .......... *H04L 9/0852* (2013.01); *H04L 9/0894* (2013.01); *H04L 41/16* (2013.01)

(58) Field of Classification Search
CPC ...... H04L 9/0852; H04L 9/0894; H04L 41/16
USPC .......................................................... 380/278
See application file for complete search history.

(56) References Cited

U.S. PATENT DOCUMENTS

| | | | |
|---|---|---|---|
| 7,492,904 B2 | 2/2009 | Young | |
| 8,116,636 B2 | 2/2012 | Youn et al. | |
| 8,477,939 B2 | 7/2013 | Youn et al. | |
| 2022/0350898 A1* | 11/2022 | Lv | H04L 9/16 |
| 2023/0342649 A1* | 10/2023 | Flament | G02F 1/0136 |
| 2024/0020105 A1* | 1/2024 | Palamadai | H04L 67/34 |

FOREIGN PATENT DOCUMENTS

| | | |
|---|---|---|
| KR | 10-2008-0056273 A | 6/2008 |
| WO | 2018/065393 A1 | 4/2018 |

* cited by examiner

*Primary Examiner* — Chau Le
*Assistant Examiner* — Phuc Pham
(74) *Attorney, Agent, or Firm* — BROADVIEW IP LAW, PC

(57) ABSTRACT

The present disclosure relates to a method for autonomous management and control in a quantum key distribution network and a device therefor. A method performed by an apparatus including a first entity in a QKDN supporting AMC according to one aspect of the present disclosure may include: collecting first data from a second entity; determining whether a first ML model available for analyzing the first data exists; generating a control action, wherein i) if the first ML model exists, the control action is generated by analyzing the first data using the first ML model, and ii) if the first ML model does not exist, the control action is generated by analyzing second data collected from the second entity using a second ML model received from a third entity; and requesting the second entity to apply the control action.

17 Claims, 7 Drawing Sheets

METHOD FOR AUTONOMIC MANAGEMENT AND CONTROL IN QUANTUM KEY DISTRIBUTION NETWORK AND APPARATUS FOR THE SAME

CROSS-REFERENCE TO RELATED APPLICATIONS

This application claims the benefit of earlier filing date and right of priority to Korean Application No. 10-2023-0134354, filed on Oct. 10, 2023, No. 10-2023-0169341, filed on Nov. 29, 2023, the contents of which are all hereby incorporated by reference herein in their entirety.

TECHNICAL FIELD

The present disclosure relates to a method for autonomous management and control in a quantum key distribution network and a device therefor.

BACKGROUND

The quantum key distribution network (QKDN) is expected to provide optimized support for various quantum key distribution (QKD) services. The key performance indicators (KPIs) of QKDN include optimal latency, accuracy, throughput, and key distribution availability. One of the challenges of QKDN is to ensure network performance and meet various quality of service (QOS)/quality of experience (QoE) requirements of various application scenarios.

In particular, as the number and variety of devices and other resources that constitute individual QKDNs continue to increase, automating QKDN control and management tasks becomes more and more important to prevent inappropriate actions in a timely manner and improve QoS.

SUMMARY

A technical object of the present disclosure is to provide a method and an apparatus for autonomic management and control (AMC) in a QKDN.

The technical objects to be achieved by the present disclosure are not limited to the above-described technical objects, and other technical objects which are not described herein will be clearly understood by those skilled in the pertinent art from the following description.

A method performed by an apparatus including a first entity in a quantum key distribution network (QKDN) supporting autonomic management and control (AMC) according to one aspect of the present disclosure may include: collecting first data from a second entity; determining whether a first machine learning (ML) model available for analyzing the first data exists; generating a control action, wherein i) if the first ML model exists, the control action is generated by analyzing the first data using the first ML model, and ii) if the first ML model does not exist, the control action is generated by analyzing second data collected from the second entity using a second ML model received from a third entity; and requesting the second entity to apply the control action.

An apparatus including a first entity in a quantum key distribution network (QKDN) supporting autonomic management and control (AMC) according to an additional aspect of the present disclosure may include: at least one processor; and at least one memory operably connected to the at least one processor and storing instructions that, when executed by the one or more processors, cause the apparatus to perform operations. The operations may include: collecting first data from a second entity; determining whether a first machine learning (ML) model available for analyzing the first data exists; generating a control action, wherein i) if the first ML model exists, the control action is generated by analyzing the first data using the first ML model, and ii) if the first ML model does not exist, the control action is generated by analyzing second data collected from the second entity using a second ML model received from a third entity; and requesting the second entity to apply the control action.

At least one non-transitory computer-readable medium storing at least one instruction according to an additional aspect of the present invention, wherein the at least one instruction executable by at least one processor may control an apparatus to: collect first data from a second entity; determine whether a first machine learning (ML) model available for analyzing the first data exists; generate a control action, wherein i) if the first ML model exists, the control action is generated by analyzing the first data using the first ML model, and ii) if the first ML model does not exist, the control action is generated by analyzing second data collected from the second entity using a second ML model received from a third entity; and request the second entity to apply the control action.

Preferably, the second data may be processable data after receiving the second ML mode.

Preferably, the second ML model may be generated by training using the first data.

Preferably, the first data and/or the second data may include one or more quantum channel performance related parameters.

Preferably, the first data and/or the second data may include at least one of i) a quantum bit-error ratio (QBER) of a quantum channel, ii) a single photon detector (SPD) output counter, and iii) a code formation rate.

Preferably, the control action may include an action related to improving performance of a quantum channel Preferably, the first data and/or the second data may include i) real-time service data and ii) key storage status data.

Preferably, the real-time service data may include at least one of i) a service type, ii) a security level, and iii) a required key quantity, and the key storage status data may include at least one of i) a key number and ii) a key life cycle.

Preferably, the control action may include an action related to scheduling and utilization of a key resource.

Preferably, the first data and/or the second data may include at least one of i) a quantum key distribution (QKD) link parameter, ii) a key consumption rate and service requirement, and iii) a QKDN topology, and the control action may include an optimal key relay route.

According to an embodiment of the present invention, service quality and performance of a QKDN can be improved by utilizing an autonomous management and control procedure.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
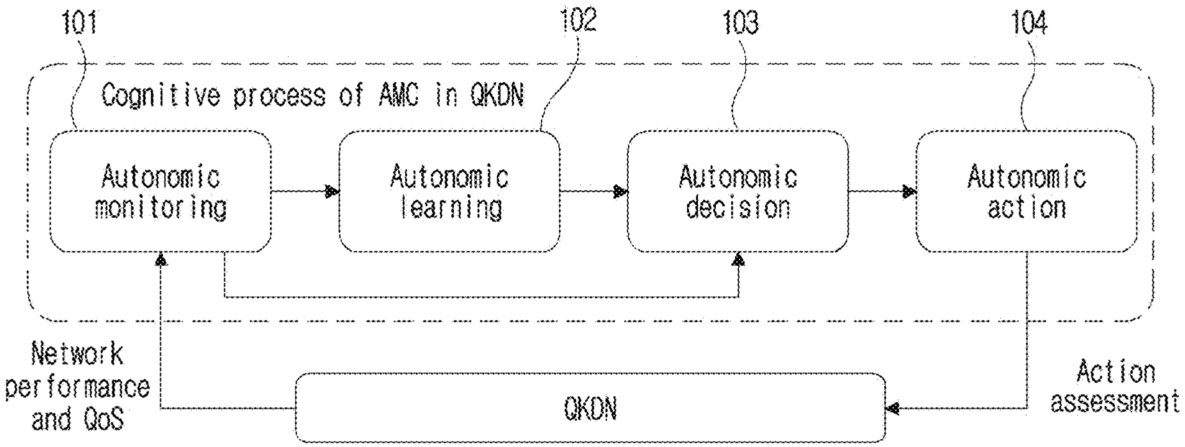
FIG. 1 illustrates a cognitive process of AMC in a QKDN.

Since the present disclosure can make various changes and have various embodiments, specific embodiments will be illustrated in the drawings and described in detail in the detailed description. However, this is not intended to limit the present disclosure to specific embodiments, and should be understood to include all changes, equivalents, and substitutes included in the feature and technical scope of the present disclosure. Similar reference numbers in the drawings refer to identical or similar functions across various aspects. The shapes and sizes of elements in the drawings may be exaggerated for clearer explanation. For a detailed description of the exemplary embodiments described below, refer to the accompanying drawings, which illustrate specific embodiments by way of example. These embodiments are described in sufficient detail to enable those skilled in the art to practice the embodiments. It should be understood that the various embodiments are different from one another but are not necessarily mutually exclusive. For example, specific shapes, structures and characteristics described herein with respect to one embodiment may be implemented in other embodiments without departing from the spirit and scope of the disclosure. Additionally, it should be understood that the position or arrangement of individual components within each disclosed embodiment may be changed without departing from the spirit and scope of the embodiment. Accordingly, the detailed description that follows is not to be intended in a limiting sense, and the scope of the exemplary embodiments is limited only by the appended claims, together with all equivalents to what those claims assert if properly described.

In the present disclosure, terms such as first, second, etc. may be used to describe various components, but the components should not be limited by the terms. The above terms are used only for the purpose of distinguishing one component from another. For example, a first component may be referred to as a second component, and similarly, the second component may be referred to as a first component without departing from the scope of the present disclosure. The term "and/or" includes any of a plurality of related stated items or a combination of a plurality of related stated items.

When a component of the present disclosure is referred to as being "connected" or "accessed" to another component, it may be directly connected or connected to the other component, but other components may exist in between. It must be understood that it may be possible. On the other hand, when it is mentioned that a component is "directly connected" or "directly accessed" to another component, it should be understood that there are no other components in between.

The components appearing in the embodiments of the present disclosure are shown independently to represent different characteristic functions, and do not mean that each component is comprised of separate hardware or one software component. That is, each component is listed and included as a separate component for convenience of explanation, and at least two of each component can be combined to form one component, or one component can be divided into a plurality of components to perform a function, and each of these components can be divided into a plurality of components. Integrated embodiments and separate embodiments of the constituent parts are also included in the scope of the present disclosure as long as they do not deviate from the essence of the present disclosure.

The terms used in this disclosure are only used to describe specific embodiments and are not intended to limit the disclosure. Singular expressions include plural expressions unless the context clearly dictates otherwise. In the present disclosure, terms such as "comprise" or "have" are intended to designate the presence of features, numbers, steps, operations, components, parts, or combinations thereof described in the specification, but are not intended to indicate the presence of one or more other features. It should be understood that this does not exclude in advance the possibility of the existence or addition of elements, numbers, steps, operations, components, parts, or combinations thereof. In other words, the description of "including" a specific configuration in this disclosure does not exclude configurations other than the configuration, and means that additional configurations may be included in the scope of the implementation of the disclosure or the technical feature of the disclosure.

Some of the components of the present disclosure may not be essential components that perform essential functions in the present disclosure, but may simply be optional components to improve performance. The present disclosure can be implemented by including only essential components for implementing the essence of the present disclosure, excluding components used only to improve performance, and a structure that includes only essential components excluding optional components used only to improve performance is also included in the scope of rights of this disclosure.

Hereinafter, embodiments of the present disclosure will be described in detail with reference to the drawings. In describing the embodiments of the present specification, if it is determined that a detailed description of a related known configuration or function may obscure the gist of the present specification, the detailed description will be omitted, and the same reference numerals will be used for the same components in the drawings. Redundant descriptions of the same components are omitted.

The following disclosure may be referenced to interpret background technology, term definitions, abbreviations, etc. related to the present invention.

[ITU-T Y.3324] Recommendation ITU-T Y.3324 (2018), Requirements and architectural framework for autonomic management and control (AMC) of IMT-2020 networks

[ITU-T Y.3800] Recommendation ITU-T Y.3800 (2019), Framework for Networks to support Quantum Key Distribution (QKD)

[ITU-T Y.3801] Recommendation ITU-T Y.3801 (2020), Functional requirements for quantum key distribution networks (QKDN)

[ITU-T Y.3814] Recommendation ITU-T Y.3814 (2023), Functional requirements and architecture for machine learning enablement A quantum key distribution network (QKDN) can support various quantum key distribution services.

As the number and variety of devices and other resources that constitute individual QKDNs continue to increase, it becomes more important to automate QKDN control and management tasks to prevent inappropriate actions at the wrong time and improve QoS. The present invention proposes a method for automating QKDN services while simultaneously addressing QKDN control and management issues. In other words, the present invention proposes a method for performing an autonomic management and control (AMC) procedure in QKDN and a device therefor.

The following terms that may be used in this disclosure are defined as follows:

Autonomic management and control (AMC): refers to a behavior or action that are determined in a reactive or proactive manner based on external stimuli (environmental aspects), as well as the goals to be achieved, operating principles, capabilities, experience and knowledge. Here, in the case of a software defined network, the definition of AMC could mean that the AMC has the ability to dynamically select the setting/configuration of the network and to control and manage the network, through self-management functionality that reaches optimal decisions, taking into account the context of operation (environmental requirements and characteristics), goals and policies (corresponding to operating principles), profiles (corresponding to capabilities, i.e. supported functions) and machine learning (for managing and utilizing knowledge and experience)

Key manager (KM): refers to a functional module located in a quantum key distribution (QKD) node to perform key management in the key management layer.

Quantum key distribution (QKD): refers to a procedure or method for generating and distributing symmetrical cryptographic keys with information-theoretic security based on quantum information theory.

QKD link (quantum key distribution link): refers to a communication link between two QKD modules for operating QKD. Here, the QKD link may include a quantum channel for quantum signal transmission and a classical channel used to exchange information for synchronization and key distillation.

QKD module: refers to a set of hardware and software components that implements cryptographic functions and quantum optical processes, including QKD protocol, synchronization, and distillation for key generation, and is included within a defined cryptographic boundary. Here, the QKD module is connected to the QKD link, acting as an endpoint module where keys are generated, and there are two types of QKD modules: a transmitter (QKD-Tx) and a receiver (QKD-Rx).

Quantum Key Distribution Network Controller (QKDN controller): refers to a functional module located in the QKD network control layer that controls a QKD network.

QKDN manager: refers to a functional module located in a QKD network management layer that monitors and manages a QKD network.

QKD node: refers to a node that includes one or more QKD modules that are protected from intrusion and attacks by unauthorized parties. Here, a QKD node may include a key manager (KM).

Quality of service (QOS): refers to the totality of characteristics of a communication service that bear on its ability to satisfy stated and implied needs of service users.

ML-enabled QKDN (Machine learning-enabled quantum key distribution network)): refers to a QKDN that extends or enhances its functionalities through machine learning (ML) capabilities to achieve various objectives.

AMC-enabled QKDN (Autonomic management and control enabled quantum key distribution network): refers to a QKDN that extends or enhances its functionalities enabled by AMC (autonomous management and control) capabilities to achieve various objectives. It can be simply referred to as QKDNamc.

ML sandbox (ML sandbox: machine learning sandbox): refers to an environment where a ML model can be trained, verified, and its impact on a network can be analyzed.

Here, a ML sandbox can be designed to prevent an ML application from impacting a network or to restrict an use of a specific ML function.

The abbreviations for terms that can be used in this disclosure are defined as follows.

AMC: Autonomic Management and Control
CL: Control Layer
CLMO: Cross Layer Management and Orchestration
DE: Decision-making Element
KM: Key Manager
KMA: Key Management Agent
KML: Key Management Layer
KML DE: Key Management Layer autonomic Decision-making Element
KSA: Key Supply Agent
ME: Management Entity
ML: Machine Learning
NE: Network Element
NFV: Network Function Virtualization
NP: Network Performance
OSNR: Optical Signal-to-Noise Ratio
QBER: Quantum Bit-Error Rate Ratio
QL: Quantum Layer
QKD: Quantum Key Distribution
QKDN: QKD Network
QL DE: Quantum Layer autonomic Decision-making Element
QoS: Quality of Service
SDN: Software-Defined Networking
SPD: Single Photon Detector
QKDNamc: Autonomic management and control (AMC)-enabled QKDN FIG. 1 illustrates a cognitive process of AMC in a QKDN.

Referring to FIG. 1, a cognitive process of AMC in a QKDN is based on a decision-making feedback loop of sub-processes of autonomic monitoring (101), autonomic learning (102), autonomic decision (103), and autonomic action (104). The following may be considered for each sub-process:

- autonomic monitoring (101): This process involves collecting and analyzing information about the network performance (NP) and QoS of a QKDN, such as QKD module status, key manager status, etc. The monitoring data can be used to detect changes in a QKDN that may require attention.
- autonomic learning (102): This process involves acquiring and updating knowledge about a QKDN based on monitored data and the environment, such as the behaviors of a QKDN functional components. The learning data can be used to improve understanding and prediction of dynamic QKDN performance.
- autonomic decision (103): This process involves selecting and planning the best course of actions to achieve the AMC goal in a QKDN. The decision data can be based on monitoring and learning data as well as predefined policies, rules, and objectives of a QKDN.
- autonomic action (104): This process involves executing and evaluating the selected action in a QKDN to modify or optimize a QKDN. The action data can be used to assess the effectiveness and efficiency of the action, which provides feedback for further monitoring and learning.

The cognitive process described in FIG. 1 corresponds to a general process. All autonomous closed loops follow the four general processes of monitoring, learning, decision, and action, but these general processes can be further divided into more specific processes depending on a timing, a priority, and a type of work. This is described with reference to FIG. 2.

Figure 2:
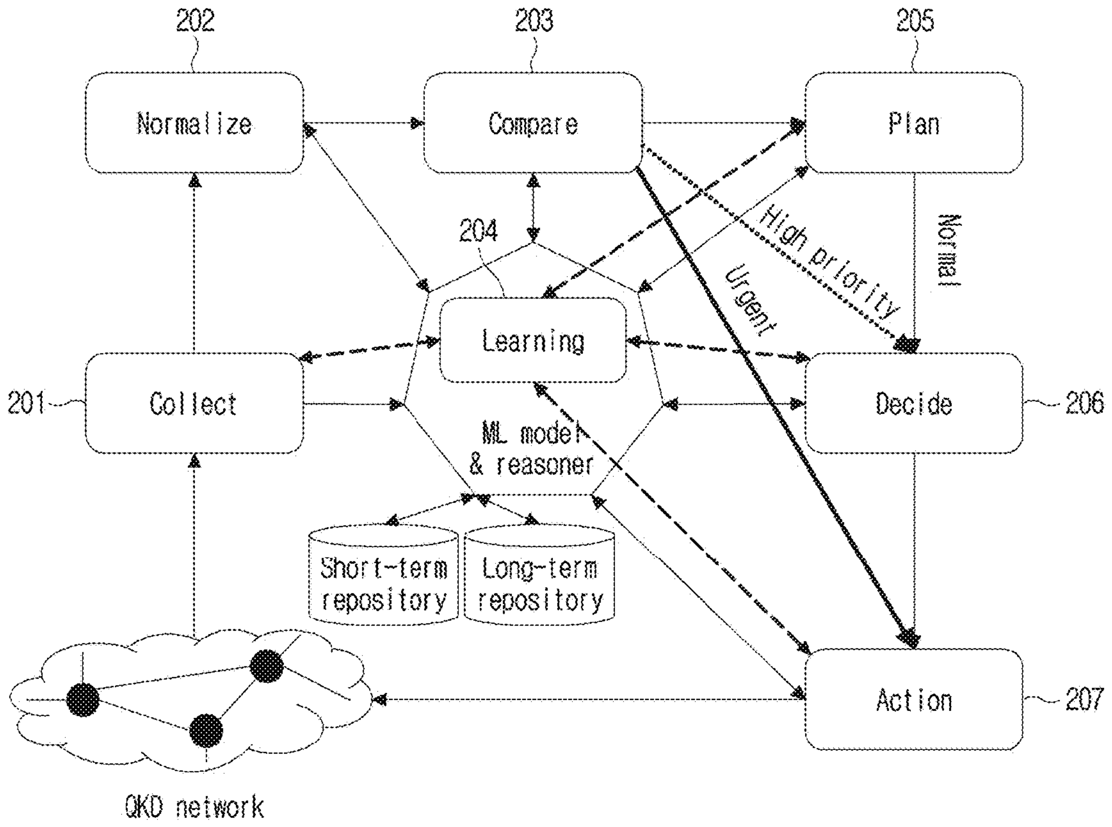
FIG. 2 illustrates an enhanced cognitive process of AMC in a QKDN.

FIG. 2 illustrates an enhanced cognitive process of AMC in a QKDN.

FIG. 2 illustrates three types of enhanced AMC cognition processes.

Referring to FIG. 2, an enhanced cognition process of AMC in a QKDN includes sub-processes of collect (201), normalize (202), compare (203), learning (204), plan (205), decide (206), and action (207).

In FIG. 1, autonomic monitoring (101) can be composed of sub-processes of collect (201) and normalize (202) in FIG. 2. Autonomic decision (103) can be composed of the sub-processes of compare (203), plan (205), and decide (206). Autonomic learning (102) can correspond to learning (204), and autonomic action (104) can correspond to action (207).

For example, when a cognition process for AMC is first started, there is no learning information or history information on an AMC operation. In this case, an entire cycle of autonomic monitoring (101), autonomic learning (102), autonomic decision (103), and autonomic action (104) should be executed. However, if there is learned or history information, decision, and/or action, some processes such as learning and/or decision processes can be skipped to execute a cognition process more efficiently. Therefore, if a monitored event is learned or known in advance, the fastest loop (urgent) monitoring (201, 202), compare (203), and action (207) processes can be performed (i.e., plan (205) and decide (206) processes can be omitted). If learned or recorded information exists but additional decision-making processes are required, another fast loop (high priority) monitoring (201, 202), compare (203) and decide (206) can be performed (i.e., plan (205) process can be omitted).

Figure 3:
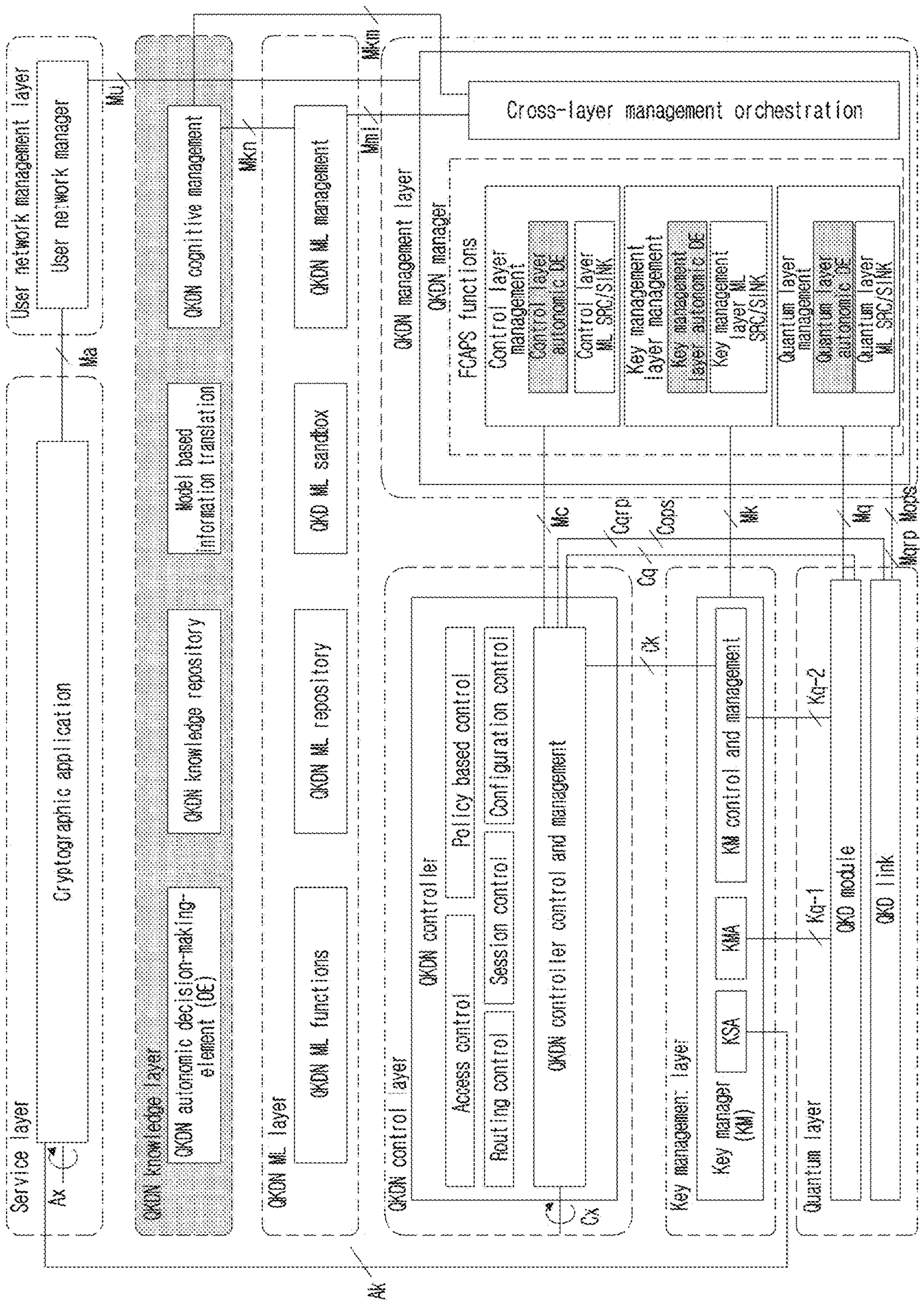
FIG. 3 illustrates an architecture model for a QKDN (QKDNamc) supporting AMC according to an embodiment of the present invention.

FIG. 3 illustrates an architecture model for a QKDN (QKDNamc) supporting AMC according to an embodiment of the present invention.

Referring to FIG. 3, an entire network may include a user network and a QKDN. Here, a QKDNamc may be defined/configured separately from a user network, and may be defined/configured including a user network. Hereinafter, for convenience of explanation, a QKDNamc is described assuming that it is separated from a user network.

A user network may include applications such as an encryptor and a decryptor. A QKDN may include a QKD nodes including a QKD module, a QKD link connecting the QKD node, a relay point (key relay), and an optical switch/splitter.

A user network may include a service layer and a user network management layer. A service layer may use shared key pairs provided by a QKDN and perform secure communication. A cryptographic application of a service layer may utilize shared key pairs provided by a QKDN and perform encrypted communication between remote parties. Three representative cryptographic applications of a service layer may include a point-to-point application, a point-to-multipoint application, and a multipoint-to-multipoint application. A user network management layer may perform FACPS (fault, configuration, accounting, performance, security) functions of a user network.

A QKDNamc can support autonomous management capabilities including a knowledge layer with a cognitive management function. A QKDNamc can support real-time, near real-time and/or non-real-time AMC decision-making and actions. In addition, a cognition process of a QKDNamc can support three operation modes (i.e., emergency, high priority and normal) as illustrated in FIG. 2. A QKDNamc can support autonomous collection/reception of status information from a Quantum Layer, a Key Management Layer and a QKDN control layer. In addition, a QKDNamc can provide autonomous configuration control of a QKD module, a QKD link, a Key Management (KM) and a Key Management Link (KM link). In addition, a QKDNamc can provide autonomous configuration management of virtual and physical resource provisioning.

A QKDNamc can provide an autonomous fault management function to support autonomous analysis of collected/received status information for fault indicators. In addition, a QKDNamc can support an automatic diagnosis of known faults (e.g., faults affecting traffic or faults not affecting traffic). In addition, a QKDNamc can support autonomous healing based on, for example, an autonomous location and an autonomous reconciliation of a root cause of known faults. In addition, it can support autonomous protection from malicious attacks and unauthorized access. A QKDNamc can automatically provide security management to support automatic management of authentication and authorization.

A QKDNamc may include various entities such as a QKDN knowledge layer, a QKDN ML layer, a QKDN control layer, a Key Management Layer, a Quantum Layer, and a QKDN management layer.

Functional elements of a Quantum Layer include a QKD link and a QKD module, and can be enabled to easily communicate with a QKDN controller. Parameters of a quantum layer, such as a quantum key generation rate, a transmit power, and a receive power, can be adjusted by a QKDN controller of a QKDN control layer. Functions of a QKD link can include, for example, an optical switching/splitting function, a quantum relay function, etc. Functions of a QKD module can include, for example, a key distillation function, a quantum channel synchronization function, a quantum communication, a QKD key supply function, a random number generation (RNG) function, a channel multiplexing function, and a QKD module control and management function, etc.

Functional elements of a Key Management Layer may include a Key Manager (KM). A KM includes a key supply agent (KSA), a key management agent (KMA), and a key management control and management (KM control and management) block, and may exchange messages for control and management with a QKDN controller. Functions of a KMA may include, for example, a key relay function, a key storage function, and a key life cycle management function, etc. Functions of a KSA may include, for example, a key supply function, and may further include a key combination function.

Functional elements of a QKDN control layer may include a QKDN controller. A QKDN controller may control various resources to ensure security, stability, efficiency, and robustness of an operation of a QKDN. Here, resources may correspond to elements constituting a QKDN. Resources may include at least one of a switch, a router, a quantum node capable of generating a quantum cryptographic key, a key storage device for storing and managing a key, a transmission device for key transmission, and a control server or a management server for controlling and managing the above devices. Functions of a QKDN controller may include, for example, a routing control function, a configuration control function, an access control function, a session control function, a policy based control function, and a QKDN controller control and management function, etc.

Functional elements of a QKDN machine learning layer may include a machine learning modeling (QKDN-van MLMS) function, a machine learning sandbox (QKDN-qos ML Sandbox), a machine learning function (QKDN-qos ML Functions_), a machine learning storage (QKDN-qos ML repository) function, and a machine learning cognition (QKDN-qos ML cognition) function, etc. Machine learning models generated by a QKDN machine learning layer can be used for prediction of QoS-related anomalies, evaluation of QoS-related data, static parameter tuning in a quantum layer and a key management layer, dynamic feedback, determination of key relay paths, measurement of QoS parameters of QoS enforcement policies, or reconfiguration of QKD modules, QKD links, KMs and KM link(s).

Elements of a QKDN management layer can communicate with a QKDN controller to obtain configuration and management information. A QKDN management layer includes a QKDN manager, and functions of a QKDN manager may include a FACPS (fault, configuration, accounting, performance, security) functions and a cross-layer management orchestration function. FACPS functions may include a Control layer Management function, a Key management layer Management function, a Quantum layer Management function, etc.

Control layer Management functions may include a Control layer autonomic DE function and a Control layer ML SRC (source)/SINK function. A Control layer autonomic DE supports a real-time or near real-time fast closed-loop operation.

Key Management Layer Management functions may include a Key Management Layer Autonomic Decision Element (Key Management Layer Autonomic DE) function and a Key Management Layer Machine Learning Source/Sink (Key Management Layer ML SRC (source)/SINK) function. A Key Management Layer Autonomic DE supports a real-time or near real-time fast closed-loop operation.

Quantum layer management (QM) functions may include a quantum layer autonomic DE function and a quantum layer ML source/sink (QML SRC (source)/SINK) function. A Quantum layer autonomic DE supports a real-time or near real-time fast closed-loop operation.

Functional elements of a QKDN knowledge layer may include a QKDN autonomic decision-making element (DE) functions s QKDN knowledge repository function, a model-based information translation function, and a QKDN cognitive management function.

A QKDN knowledge layer provides functions required to support autonomous management and services of a QKDN. One of main functions of a QKDN knowledge layer is a cognitive management process (see FIGS. 1 and 2), which is a control loop including monitoring, learning, decision, and action sub-processes. Autonomous management decisions and related actions are performed through this process.

A QKDN autonomic DE in a QKDN knowledge layer is responsible for overall QKDN context (i.e. applicable to Control layer management function, Key management layer management function, Quantum layer management function in QKDN management layer). That is, a slow control loop operation is used in a non-real-time mode.

Functions for AMC are described in more detail.

AMC is about a Decision-making Element (DE) as autonomous functions (i.e., control loops) with a cognitive function. A component (software logic) that drives autonomics at a particular level of abstraction for self-* functionality can be called a Decision-making Element (DE). DEs are responsible for autonomous management and adaptive control of system and network resources, parameters, and services. Cognition enhances DE logic and enables DEs to manage and handle even the unforeseen situations and events detected in the environment around the DE(s).

That is, DEs are autonomous functions (e.g., control loops) with cognition processes in the control and management plane. DEs realizes self-* functions (self-configuration, self-optimization, etc.) as a result of the decision-making behavior of a DE, which performs dynamic/adaptive control and management of its associated Managed Entity (ME) and their configurable and controllable parameters. Such a DE can be embedded in a specific layer of an external overall network and service control and management architecture or in a network node (i.e., a network element (NE)). An NE can be physical or virtualized (e.g., in the case of the NFV paradigm). From an architectural perspective, a control loop can be based on a distributed model (for a fast control loop). In this case, a DE is embedded in a node (physical or virtualized). On the other hand, in a centralized model (for a slow control loop), the DE is embedded (implemented) outside a network node. Both types of control loops act toward a global goal of ensuring a stable state of a network. A DE can negotiate with another DE to realize dynamic adaptation of network resources and parameters or services through reference points. This leads to the notion of global network autonomics, which is a result of interworking DEs as collaborative manager components that perform AMC of associated MEs and their parameters.

There can be two types of DEs, including a QKDN DE in network-level and a local DE specific to different QKDN layers. A new QKDN knowledge layer can be connected to a QKDN ML layer and a QKDN management layer via reference points Mkn and Mkm. Here, a QKDN knowledge layer can include a QKDN autonomic DE (i.e., network-level QKDN DE), QKDN knowledge repository, model based information translation, and QKDN cognitive management. A local DE is implemented in a QKDN management layer related to a quantum layer, a key management layer, and a QKDN control layer, to make the faster closed-loop decisions based on the local AMC policies. In the architectural model, DEs of a QKDN knowledge layer are logically centralized and can act as slow control loops. DEs of a QKDN management layer specific to each control layer/key management layer/quantum layer can play a fast control loop and negotiate with each other to achieve a global AMC goal.

- Quantum layer autonomic DE: provides self-management capabilities for quantum modules and links, and can support a real-time or near-real-time closed-loop operation.
- Key management layer autonomic DE: provides self-management capabilities for optimal key storage and distribution, and can support a real-time or near-real-time closed-loop operation.
- Control layer autonomic DE: provides self-management capabilities for control plane resources and functional entities for autonomous control orchestration and control entity management, and can support a real-time or near-real-time closed-loop operation.
- QKDN autonomic DE provides global AMC capabilities for QKDN at the network level. It makes autonomous policy decisions (where applicable) that encompass a quantum layer, a key management layer, and a control layer as a slow closed loop.
- QKDN knowledge repository: provides capabilities to store the QKDN-wise self-management policy information in a distributed manner to deal with the scalability of large volumes and performance of accessing distributed repositories.
- Model-based information translation: provides translation of self-management policies into layer specific provisioning rules. To support heterogeneous types of information, a translation model is used to translate from/to heterogeneous information into a common one.
- QKDN cognitive management: provides a realization of the cognition process by orchestration in the network-level. It also supports interaction with a QKDN management layer to deploy the DE decision policies into a control layer autonomic DE, a key management layer DE, and a quantum layer DE, and to monitor status of an operation of DEs.

Meanwhile, information exchange between components within a QKDN architecture can be performed through logical interfaces between layers, functional elements, and entities, which are defined as a reference point. For example, a reference point connecting QKDN cognitive management and QKDN ML management can be defined as Mkn. It can be responsible for exchanging orchestration information requesting ML functions and learned QKDN information between QKDN ML management and QKDN cognitive management. In addition, a reference point connecting QKDN cognitive management and cross-layer management orchestration can be defined as Mkm. It can be responsible for exchanging orchestration information that implements the cognition process between QKDN cognitive management and QKDN manager.

Figure 4:
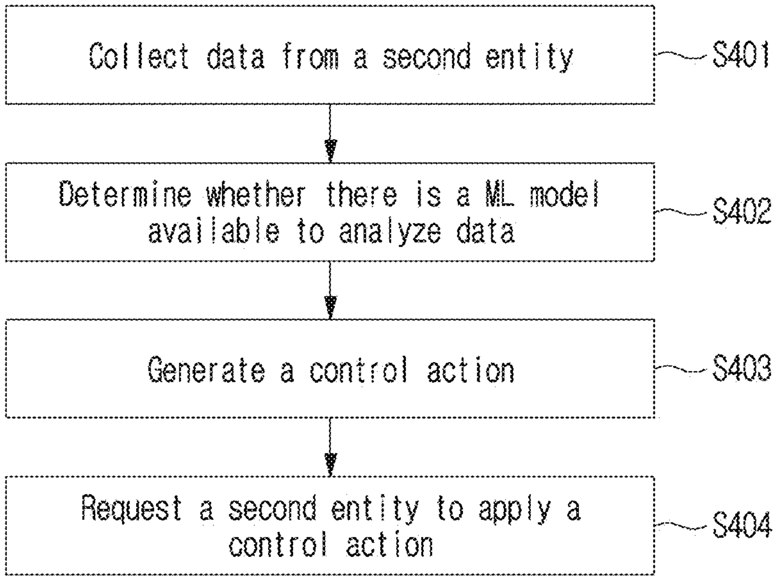
FIG. 4 illustrates an autonomous management and control method according to an embodiment of the present invention.

FIG. 4 illustrates an autonomous management and control method according to an embodiment of the present invention.

Hereinafter, in the description of the present invention, an entity may refer to an operating entity (i.e., a device or some components within a device) corresponding to one layer or may refer to an operating entity (i.e., a device or some components within a device) performing one function within one layer, in a QKDNamc architecture of FIG. 3.

In addition, even if there is no separate description in this document, an entity may mean a device, or may correspond to a component within a device. That is, when an entity performs an action, it can be interpreted that a device (or a device including components) performs an action.

Referring to FIG. 4, a first entity in QKDN supporting AMC collects first data from a second entity (S401).

Here, the first data may mean data required for predicting quantum channel performance. That is, the first data may include one or more quantum channel performance-related parameters. For example, the first data may include at least one of i) a quantum bit-error ratio (QBER) of a quantum channel, ii) a single photon detector (SPD) output counter, and iii) a code formation rate.

In addition, the first data may mean data required for key storage management. That is, the first data may include i) real-time service data and ii) key storage status data. For example, the real-time service data may include at least one of i) a service type, ii) a security level, and iii) a required key quantity, and key storage status data may include at least one of i) a key number and ii) a key life cycle.

In addition, the first data may mean data required for key relay routing optimization. That is, the first data may include at least one of i) a quantum key distribution (QKD) link parameter, ii) a key consumption rate and service requirement, and iii) a QKDN topology.

A first entity determines whether there is a first machine learning (ML) model available to analyze first data (S402).

That is, a first entity can determine whether there is a first ML model that can analyze the first data and generate a control action based on it.

A first entity generates a control action (S403).

In step S402, if the first ML model exists, the control action can be generated by analyzing the first data using the first ML model. That is, the first entity can generate the control action by analyzing the first data using the first ML model.

On the other hand, if the first ML model does not exist, the control action can be generated by analyzing second data collected from the second entity using second ML model received from third entity. In other words, if the first ML model does not exist, the first entity can request the third entity to generate second ML model. Here, second ML model can be generated by training using the first data. In addition, the first entity can receive the second ML model from the third entity. In addition, the first entity can generate the control action by analyzing the second data using the second ML model. Here, the second data can mean data that can be processed after the first entity receives the second ML model. That is, the second data can mean data newly collected from the second entity after the first entity receives the second ML model. Therefore, the second data can correspond to the same type of data as the first data, except that the time of collection is different.

A first entity requests a second entity to apply a control action (S404).

Here, if the first data and/or the second data correspond to data required for predicting quantum channel performance, the control action may correspond to an action required for improving quantum channel performance.

Alternatively, if the first data and/or the second data correspond to data required for key storage management, the control action may correspond to an action required for efficient use of key resources and reasonable scheduling.

Alternatively, if the first data and/or the second data correspond to data required for key relay routing optimization, the control action may include an optimal key relay route.

Hereinafter, in order to explain how AMC is performed in a QKDN, the three basic operating procedures of AMC (AMC basic operating procedures for quantum channel performance prediction, AMC basic operating procedures for key storage management, AMC basic operating procedures for key relay routing optimization) are described based on a QKDNamc architecture model defined in FIG. 3.

Figure 5:
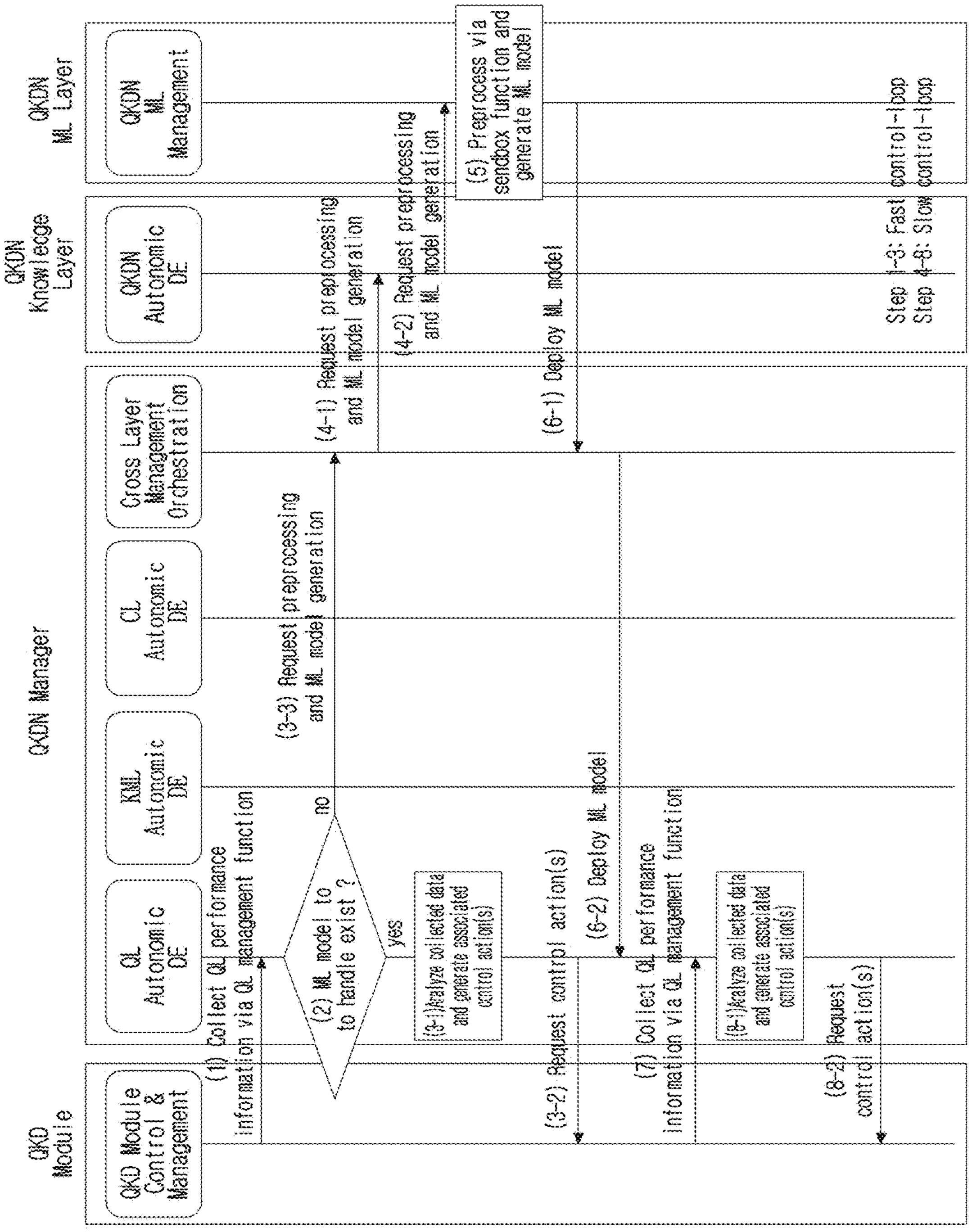
FIG. 5 is a diagram illustrating an AMC basic operation procedure for machine learning-based quantum channel performance prediction according to an embodiment of the present invention.

FIG. 5 is a diagram illustrating an AMC basic operation procedure for machine learning-based quantum channel performance prediction according to an embodiment of the present invention.

For the implementation and commercialization of a QKDN, stable and predictable quantum channel performance and transmission quality in a quantum layer are crucial. The main challenge is that the noise falls into the quantum channel, thereby reducing the quality of quantum channel and causing low key rate, especially when quantum-encoded photons coexist with high-intensity classical signals. In FIG. 5, an AMC procedure supported by ML-based quantum channel performance prediction such as optical signal-to-noise ratio (OSNR) and quantum bit-error ratio (QBER).

(1) The Quantum Layer autonomic Decision-making Element (QL (autonomic) DE) function (in QL management function) in QKDN manager collects quantum channel performance-related parameters (e.g., QBER of quantum channel, the Sigle Photon Detector (SPD) output counter, code formation rates under different noise environments) from the QKD module (in particular, Quantum Layer (QL) QKD module control and management function.

(2) The QL autonomic DE checks if an ML model is available to analyze the collected data and generate associated autonomic control action(s).

(3-1) If an ML model exists, the QL autonomic DE perform analytics of the collected performance data and generate associated control action(s).

(3-2) The QL autonomic DE send the control action(s) to QL QKD module control and management function to apply. This control action is performed in real or near-real time which is the urgent process (fast control-loop) of the AMC cognition process (see FIG. 2).

(3-3) If an ML model doesn't exist, the QL autonomic DE requests to create an ML model to QKDN knowledge layer via Cross Layer Management and Orchestration (CLMO) function in QKDN manager.

(4-1) The CLMO then conveys the request message (i.e. pre-processing and ML model generation requests) to QKDN automatic DE in QKDN knowledge layer for further processing.

(4-2) The QKDN automatic DE in QKDN knowledge layer then send the request to the QKDN ML layer to pre-process, train the data and generate an ML model.

(5) This process is handled by ML sandbox function in ML layer. That is, the ML sandbox function performs preprocessing and generates an ML model.

(6-1) The ML model deployment request generated by the QKDN ML layer is sent back to the CLMO (i.e. QKDN ML layer deploys ML model to CLMO).

(6-2) Then it further is sent to the CLMO. That is, the CLMO passes the ML model received from the QKDN ML layer to the QL autonomic DE.

(7) The QL autonomic DE function in QKDN manager collects quantum channel performance-related parameters (e.g. QBER of quantum channels, SPD (Single Photon Detector) output counter, code formation rate in various noise environments) from the QKD module (in particular, the QL QKD module control and management function), which can handle them now.

(8-1) The QL autonomic DE then performs analytics of the collected performance data and generates associated control action(s) (i.e. using the ML model received in step 6-2). Here, the control action(s) may include an action related to improving the performance of the quantum channel. For example, the control action(s) may include an action for lowering the OSNR value and/or the QBER value. That is, the control action(s) may include an action for preventing a low key rate while reducing the quality of the quantum channel.

(8-2) The QL autonomic DE send the control action(s) to the QKD module (in particular, QL QKD module control and management function) to apply. This control action is performed in non-real time since the ML model generation process is involved which is the normal process (slow control-loop) of the AMC cognition process (see FIG. 2).

Figure 6:
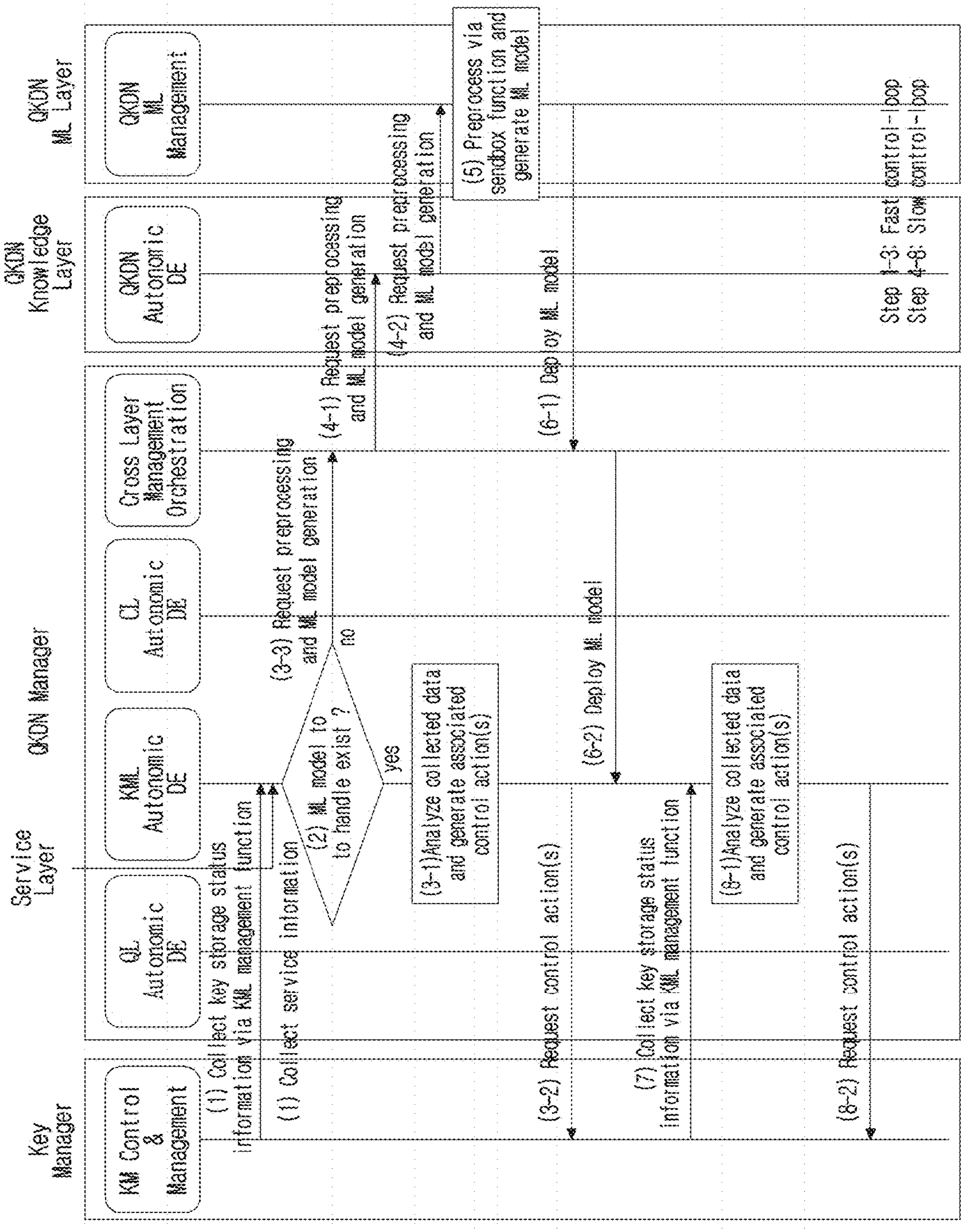
FIG. 6 is a diagram illustrating an AMC basic operation procedure for machine learning-based key storage management according to an embodiment of the present invention.

FIG. 6 is a diagram illustrating an AMC basic operation procedure for machine learning-based key storage management according to an embodiment of the present invention.

Since QKDN services are dynamic and extensive, efficient key storage management is required to realize reasonable scheduling and efficient utilization of key resources. ML-based key storage management solution can reasonably evaluate and predict the status of key storage. FIG. 6 illustrates the AMC procedure supported by ML-based key storage management.

(1) The Key Management Layer autonomic Decision-making Element (KML (autonomic) DE) function (in KML management function) in QKDN manager collects service data from the service layer (e.g., service type, security level, required key quantity) in real time and key storage status (e.g., key numbers, key life cycle) from the Key manager (in particular, the KML control and management function).

(2) The KML autonomic DE checks if an ML model is available to analyze the collected data and generate associated autonomic control action(s).

(3-1) If an ML model exists, the KML autonomic DE perform analytics of the collected service and key storage status data and generate associated control action(s).

(3-2) The KML autonomic DE send the control action(s) to the Key manager (in particular, KML control and management function) to apply. This control action is performed in real or near-real time which is the urgent process (fast control-loop) of the AMC cognition process (see FIG. 2).

(3-3) If an ML model doesn't exist, the KML autonomic DE requests to create an ML model to QKDN knowledge layer via CLMO function in QKDN manager (i.e. preprocessing and ML model creation requests).

(4-1) The CLMO then conveys the request message to the QKDN automatic DE in QKDN knowledge layer for further processing (i.e. preprocessing and ML model creation requests).

(4-2) The QKDN automatic DE in QKDN knowledge layer then send the request to the QKDN ML layer to pre-process, train the data and generate an ML model (i.e. preprocessing and ML model creation requests).

(5) This process is handled by ML sandbox function in QKDN ML layer. That is, the ML sandbox function performs preprocessing and generates an ML model.

(6-1) The ML model deployment request generated by the QKDN ML layer is sent back to the CLMO (i.e. QKDN ML layer deploys ML model to the CLMO).

(6-2) Then it further is sent to the CLMO. That is, the CLMO passes the ML model received from the QKDN ML layer to the KML autonomic DE.

(7) The KML autonomic DE function in QKDN manager collects service data (e.g., service type, security level, number of keys required) and key storage status data (e.g., key number, key life cycle) which can handle them now.

(8-1) The KML autonomic DE then performs analytics of the collected service and key storage data and generates associated control action(s) (i.e. using the ML model received in step 6-2). Here, the control action(s) may include an action related to scheduling and utilization of resources for key storage. That is, the control action (s) may include an action that enable reasonable scheduling and efficient utilization of key resources within the key storage.

(8-2) The KML autonomic DE then send it (them) to the Key manager (in particular, KML control and management function) to apply. This control action is performed in non-real time since the ML model generation process is involved which is the normal process (slow control-loop) of the AMC cognition process (see FIG. 2).

Figure 7:
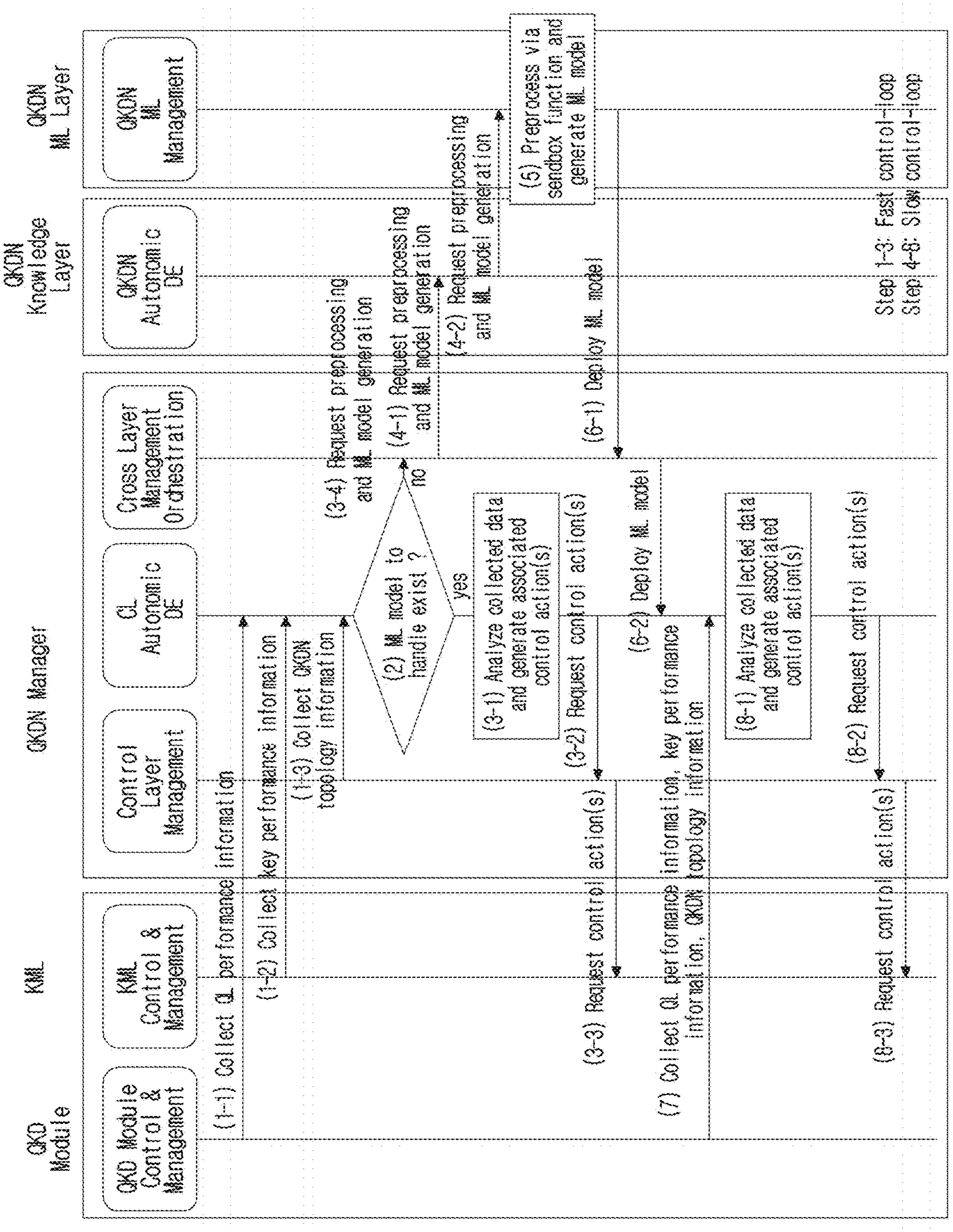
FIG. 7 is a diagram illustrating an AMC basic operation procedure for machine learning-based key relay routing optimization according to an embodiment of the present invention.

FIG. 7 is a diagram illustrating an AMC basic operation procedure for machine learning-based key relay routing optimization according to an embodiment of the present invention.

When a service request arrives, an appropriate route needs to be selected according to the key requirements and resource status in a QKDN. The QKDN control and management layer is responsible for finding and provisioning the optimal key relay route. Due to the dynamic and explosive nature of the service, the generation and consumption of key resources are often unbalanced. This leads to a problem that the service success rate is reduced when the key on the selected route cannot meet the key requirements of services. Using the ML algorithm, the optimal routing can be calculated within a reasonable time. FIG. 7 illustrates an AMC procedure supported by the ML-based key relay routing optimization.

(1) The Control layer autonomic Decision-making Element function (CL (autonomic) DE) in QKDN manager collects QKD link parameters (i.e. QL performance information) (1-1), key consumption rate and service requirements (i.e. key performance information) (1-2), and QKDN topology (i.e. QKDN topology information) (1-3) from the QL QKD module, KML control and management function and CL management function in QKDN manager.

(2) The CL autonomic DE checks if an ML model is available to analyze the collected data and generate associated autonomic control action(s).

(3-1) If an ML model exists, the CL autonomic DE perform analytics of the collected performance data and generate associated control action(s) which include an optimal key relay route. It may also include a re-routing action if re-routing is required to keep key relay routing optimal.

(3-2) The CL autonomic DE send it (them) to CL management function.

(3-3) The CL management function further sends the control action(s) (them) to the Key manager (in particular, KML control and management function) to apply (that is, provisioning the optimal key relay route). This control action is performed in real or near-real time which is the urgent process (fast control-loop) of the AMC cognition process (See FIG. 2).

(3-4) If an ML model doesn't exist, the CL autonomic DE requests to create an ML model to QKDN knowledge layer via CLMO function in QKDN manager (i.e. preprocessing and ML model generation request).

(4-1) The CLMO then conveys the request message to QKDN automatic DE in QKDN knowledge layer for further processing (i.e. preprocessing and ML model generation request).

(4-2) The QKDN automatic DE then send the request to the QKDN ML layer to pre-process, train the data and generate an ML model (i.e. preprocessing and ML model generation request).

(5) This process is handled by ML sandbox function in QKDN ML layer. That is, the ML sandbox function performs preprocessing and generates an ML model.

(6-1) The ML model deployment request generated by the QKDN ML layer is sent back to the CLMO (i.e., QKDN ML layer deploys the ML model to CLMO).

(6-2) Then it further is sent to the CLMO. That is, the CLMO passes the ML model received from the QKDN ML layer to the CL autonomic DE.

(7) The CL DE function in QKDN manager collects QKD link parameters (i.e. QL performance information), key consumption rate and service requirements (i.e. key performance information), and QKDN topology (i.e. QKDN topology information) which can handle them now.

(8-1) The CL autonomic DE then performs analytics of the collected performance data and generate associated control action(s) (i.e. using the ML model received in step 6-2). Here, the control action(s) may include an action to optimize key routing (i.e., relay route) within a reasonable time. For example, the control action(s) may include an optimal key relay route.

(8-2) The CL autonomic DE send it (them) to the Key manager (in particular, KML control and management function) to apply. This control action is performed in non-real time since the ML model generation process is involved which is the normal process (slow control-loop) of the AMC cognition process (see FIG. 2).

Figure 8:
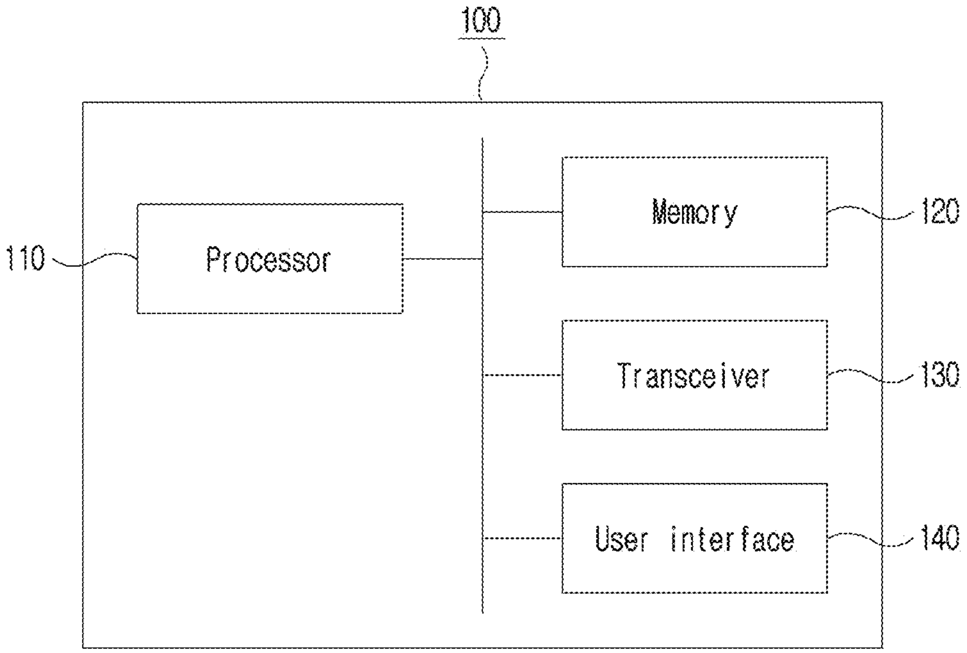
FIG. 8 is a block diagram of an autonomous management and control apparatus according to an embodiment of the present invention.

FIG. 8 is a block diagram of an autonomous management and control apparatus according to an embodiment of the present invention.

The autonomous management and control device 100 may include one or more processors 110, one or more memories 120, one or more transceivers 130, and one or more user interfaces 140. The memory 120 may be included in the processor 110 or may be configured separately. The memory 120 may store instructions that, when executed by the processor 110, cause the autonomous management and control device 100 to perform an operation. The transceiver 130 may transmit and/or receive signals and data that the autonomous management and control device 100 exchanges with other entities. The user interface 140 may receive a user's input regarding the autonomous management and control device 100 or provide an output of the autonomous management and control device 100 to the user. Among the components of the autonomous management and control device 100, components other than the processor 110 and the memory 120 may not be included in some cases, and other components not shown in FIG. 8 may be included in the autonomous management and control device 100.

The processor 110 may be configured to enable the above-described autonomous management and control device 100 to perform methods according to various examples of the present disclosure. Although not shown in FIG. 8, the processor 110 may be configured as a set of modules that perform each method/function proposed in this disclosure. Modules may be configured in hardware and/or software form.

The processor 110 collects first data from a second entity (or second apparatus). Here, the first data may mean data required for predicting quantum channel performance. That is, the first data may include one or more quantum channel performance-related parameters. For example, the first data may include at least one of i) a quantum bit-error ratio (QBER) of a quantum channel, ii) a single photon detector (SPD) output counter, and iii) a code formation rate.

In addition, the first data may mean data required for key storage management. That is, the first data may include i) real-time service data and ii) key storage status data. For example, the real-time service data may include at least one of i) a service type, ii) a security level, and iii) a required key quantity, and key storage status data may include at least one of i) a key number and ii) a key life cycle.

In addition, the first data may mean data required for key relay routing optimization. That is, the first data may include at least one of i) a quantum key distribution (QKD) link parameter, ii) a key consumption rate and service requirement, and iii) a QKDN topology.

The processor 110 determines whether there is a first machine learning (ML) model available to analyze the first data. That is, the processor 110 can determine whether there is a first ML model that can analyze the first data and generate a control action based on it.

The processor 110 generates a control action.

Here, if the first ML model exists, the control action can be generated by analyzing the first data using the first ML model. That is, the processor 110 can generate the control action by analyzing the first data using the first ML model.

On the other hand, if the first ML model does not exist, the control action can be generated by analyzing second data collected from the second entity using second ML model received from third entity. In other words, if the first ML model does not exist, the processor 110 can request the third entity (or third apparatus) to generate second ML model. Here, second ML model can be generated by training using the first data. In addition, the first entity can receive the second ML model from the third entity (or third apparatus). In addition, the processor 110 can generate the control action by analyzing the second data using the second ML model. Here, the second data can mean data that can be processed after the processor 110 receives the second ML model. That is, the second data can mean data newly collected from the second entity after the processor 110 receives the second ML model. Therefore, the second data can correspond to the same type of data as the first data, except that the time of collection is different.

The processor 110 requests a second entity (second apparatus) to apply a control action.

Here, if the first data and/or the second data correspond to data required for predicting quantum channel performance, the control action may correspond to an action required for improving quantum channel performance.

Alternatively, if the first data and/or the second data correspond to data required for key storage management, the control action may correspond to an action required for efficient use of key resources and reasonable scheduling.

Alternatively, if the first data and/or the second data correspond to data required for key relay routing optimization, the control action may include an optimal key relay route.

Components described in exemplary embodiments of the present disclosure may be implemented by hardware elements. For example, the hardware element may include at least one of a digital signal processor (DSP), a processor, a controller, an application specific integrated circuit (ASIC), a programmable logic element such as an FPGA, a GPU, other electronic devices, or a combination thereof. At least some of the functions or processes described in the exemplary embodiments of the present disclosure may be implemented as software, and the software may be recorded on a recording medium. Components, functions, and processes described in exemplary embodiments may be implemented in a combination of hardware and software.

The method according to an embodiment of the present disclosure may be implemented as a program that can be executed by a computer, and the computer program may be recorded in various recording media such as magnetic storage media, optical read media, and digital storage media.

The various technologies described in this disclosure may be implemented as digital electronic circuits or computer hardware, firmware, software, or a combination thereof. The above technologies may be implemented as a computer program product, that is, a computer program tangibly embodied in an information medium (e.g., a machine-readable storage device (e.g., a computer-readable medium) or a data processing device) or a computer program implemented as signals processed by or propagated by a data processing device to cause the operation of the data processing device (e.g., programmable processor, computer, or multiple computers).

Computer program(s) may be written in any form of programming language, including compiled or interpreted languages and may be distributed as a stand-alone program or in any form, including modules, components, subroutines, or other units suitable for use in a computing environment. A computer program may be executed by a single computer or by multiple computers distributed at one site or multiple sites and interconnected by a communications network.

Examples of processors suitable for executing computer programs include general-purpose and special-purpose microprocessors, and one or more processors in digital computers. Typically, a processor receives instructions and data from read-only memory, random access memory, or both. Components of a computer may include at least one processor for executing instructions and one or more memory devices for storing instructions and data. Additionally, the computer may include one or more mass storage devices for data storage, such as magnetic, magneto-optical disks, or optical disks, or may be connected to the mass storage devices to receive and/or transmit data. Examples of information media suitable for implementing computer program instructions and data include optical media such as semiconductor memory devices (e.g., magnetic media such as hard disks, floppy disks, and magnetic tapes), compact disk read-only memory (CD-ROM), digital video disk (DVD), etc., magneto-optical media such as floptical disks, and read only memory (ROM), random access memory (RAM), flash memory, erasable programmable ROM (EPROM), electrically erasable programmable ROM (EEPROM), and other known computer-readable media. Processors and memories can be supplemented or integrated by special-purpose logic circuits.

A processor may run an operating system (OS) and one or more software applications that run on the OS. The processor device may also access, store, manipulate, process and generate data in response to software execution. For simplicity, the processor device is described in the singular, but those skilled in the art will understand that the processor device may include a plurality of processing elements and/or various types of processing elements. For example, a processor device may include a plurality of processors or a processor and a controller. Additionally, different processing structures, such as parallel processors, may be configured. Additionally, computer-readable media refers to all media that a computer can access, and may include both computer storage media and transmission media.

Although this disclosure includes detailed descriptions of various detailed implementation examples, the details should not be construed as limiting the invention or scope of the claims proposed in this disclosure, but rather illustrating features of specific exemplary embodiments.

Features individually described in exemplary embodiments in this disclosure may be implemented by a single exemplary embodiment. Conversely, various features described in this disclosure with respect to a single exemplary embodiment may be implemented by a combination or appropriate sub-combination of a plurality of exemplary embodiments. Furthermore, in the present disclosure, the features may operate by a specific combination, and the combination may initially be described as claimed, however, in some cases, one or more features may be excluded from the claimed combination, or claimed combinations may be modified in the form of sub-combinations or modifications of sub-combinations.

Similarly, even if operations are depicted in a specific order in the drawings, it should not be understood that execution of the operations in a specific order or sequence is necessary, or that performance of all operations is required to obtain a desired result. In certain cases, multitasking and parallel processing can be useful. Additionally, it should not be understood that the various device components in all exemplary embodiments are necessarily separate, and the above-described program components and devices may be packaged in a single software product or multiple software products.

The exemplary embodiments disclosed herein are illustrative only and are not intended to limit the scope of the disclosure. Those skilled in the art will recognize that various modifications may be made to the exemplary embodiments without departing from the scope of the claims and their equivalents.

Accordingly, this disclosure is intended to include all other substitutions, modifications and changes that fall within the scope of the following claims.

What is claimed is:

1. A method performed by an apparatus including a quantum key distribution network (QKDN) management layer in a QKDN supporting autonomic management and control (AMC), the method comprising:

collecting first data from a specific layer in the QKDN;

determining whether a first machine learning (ML) model available for analyzing the first data exists;

in response to determining that the first ML model is available, generating a control action by analyzing the first data using the first ML model;

in response to determining that the first ML model is not available, i) transmitting, to a QKDN ML layer, a request for generating an ML model via a cross-layer management orchestration (CLMO), and ii) receiving, from the QKDN ML layer, a second ML model generated based on the first data via the CLMO, and iii) generating the control action by analyzing second data using the second ML model; and requesting the specific layer to apply the control action, wherein the second data are distinct from the first data and collected after receiving the second ML model, and wherein the second ML model is generated by training using the first data.

2. The method of claim 1, wherein the first data and/or the second data include one or more quantum channel performance related parameters.

3. The method of claim 2, wherein the first data and/or the second data include at least one of i) a quantum bit-error ratio (QBER) of a quantum channel, ii) a single photon detector (SPD) output counter, and iii) a code formation rate.

4. The method of claim 2, wherein the control action includes an action related to improving performance of a quantum channel.

5. The method of claim 1, wherein the first data and/or the second data include i) real-time service data and ii) key storage status data.

6. The method of claim 5, wherein the real-time service data includes at least one of i) a service type, ii) a security level, and iii) a required key quantity, and wherein the key storage status data includes at least one of i) a key number and ii) a key life cycle.

7. The method of claim 5, wherein the control action includes an action related to scheduling and utilization of a key resource.

8. The method of claim 1, wherein the first data and/or the second data include at least one of i) a quantum key distribution (QKD) link parameter, ii) a key consumption rate and service requirement, and iii) a QKDN topology, and wherein the control action includes an optimal key relay route.

9. An apparatus including a quantum key distribution network (QKDN) management layer in a QKDN supporting autonomic management and control (AMC), the apparatus comprising:

at least one processor; and at least one memory operably connected to the at least one processor and storing instructions that, when executed by the one or more processors, cause the apparatus to perform operations comprising:

collecting first data from a specific layer in the QKDN;

determining whether a first machine learning (ML) model available for analyzing the first data exists;

in response to determining that the first ML model is available, generating a control action by analyzing the first data using the first ML model;

in response to determining that the first ML model is not available, i) transmitting, to a QKDN ML layer, a request for generating an ML model via a cross-layer management orchestration (CLMO), and ii) receiving, from the QKDN ML layer, a second ML model generated based on the first data via the CLMO, and iii) generating the control action by analyzing second data using the second ML model; and requesting the specific layer to apply the control action, wherein the second data are distinct from the first data and collected after receiving the second ML model, and wherein the second ML model is generated by training using the first data.

10. The apparatus of claim 9, wherein the first data and/or the second data include one or more quantum channel performance related parameters.

11. The apparatus of claim 10, wherein the first data and/or the second data include at least one of i) a quantum bit-error ratio (QBER) of a quantum channel, ii) a single photon detector (SPD) output counter, and iii) a code formation rate.

12. The apparatus of claim 10, wherein the control action includes an action related to improving performance of a quantum channel.

13. The apparatus of claim 9, wherein the first data and/or the second data include i) real-time service data and ii) key storage status data.

14. The apparatus of claim 13, wherein the real-time service data includes at least one of i) a service type, ii) a security level, and iii) a required key quantity, and wherein the key storage status data includes at least one of i) a key number and ii) a key life cycle.

15. The apparatus of claim 13, wherein the control action includes an action related to scheduling and utilization of a key resource.

16. The apparatus of claim 9, wherein the first data and/or the second data include at least one of i) a quantum key distribution (QKD) link parameter, ii) a key consumption rate and service requirement, and iii) a QKDN topology, and wherein the control action includes an optimal key relay route.

17. At least one non-transitory computer-readable medium storing at least one instruction, wherein the at least one instruction executable by at least one processor controls an apparatus including a quantum key distribution network (QKDN) management layer in a QKDN supporting autonomic management and control (AMC) to:

collect first data from a specific layer in the QKDN;

determine whether a first machine learning (ML) model available for analyzing the first data exists;

in response to determining that the first ML model is available, generating a control action by analyzing the first data using the first ML model;

in response to determining that the first ML model is not available, i) transmitting, to a QKDN ML layer, a request for generating an ML model via a cross-layer management orchestration (CLMO), and ii) receiving, from the QKDN ML layer, a second ML model generated based on the first data via the CLMO, and iii) generating the control action by analyzing second data using the second ML model; and request the specific layer to apply the control action, wherein the second data are distinct from the first data and collected after receiving the second ML model, and wherein the second ML model is generated by training using the first data.

* * * * *